F. STOCK.
FLUID BRAKE FOR RECOIL GUNS.
APPLICATION FILED APR. 30, 1907.
905,112.
Patented Nov. 24, 1908.
3 SHEETS—SHEET 3.
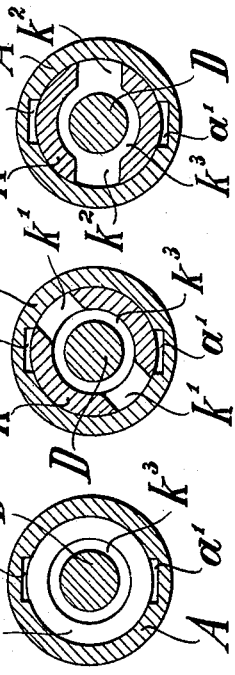
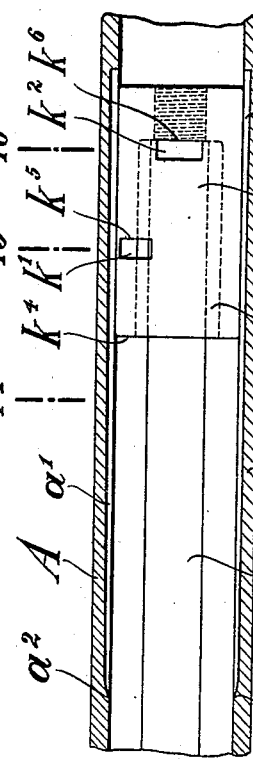
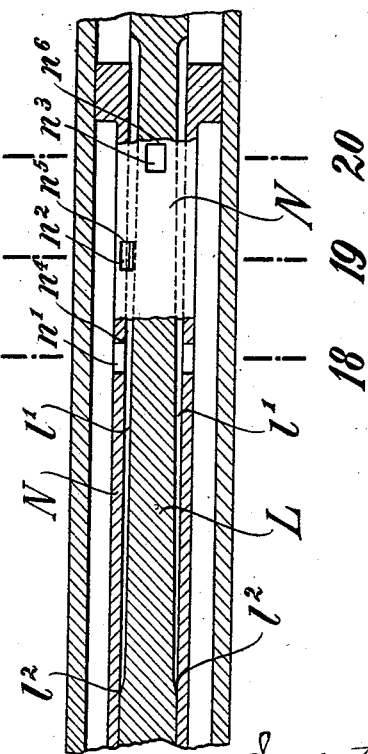

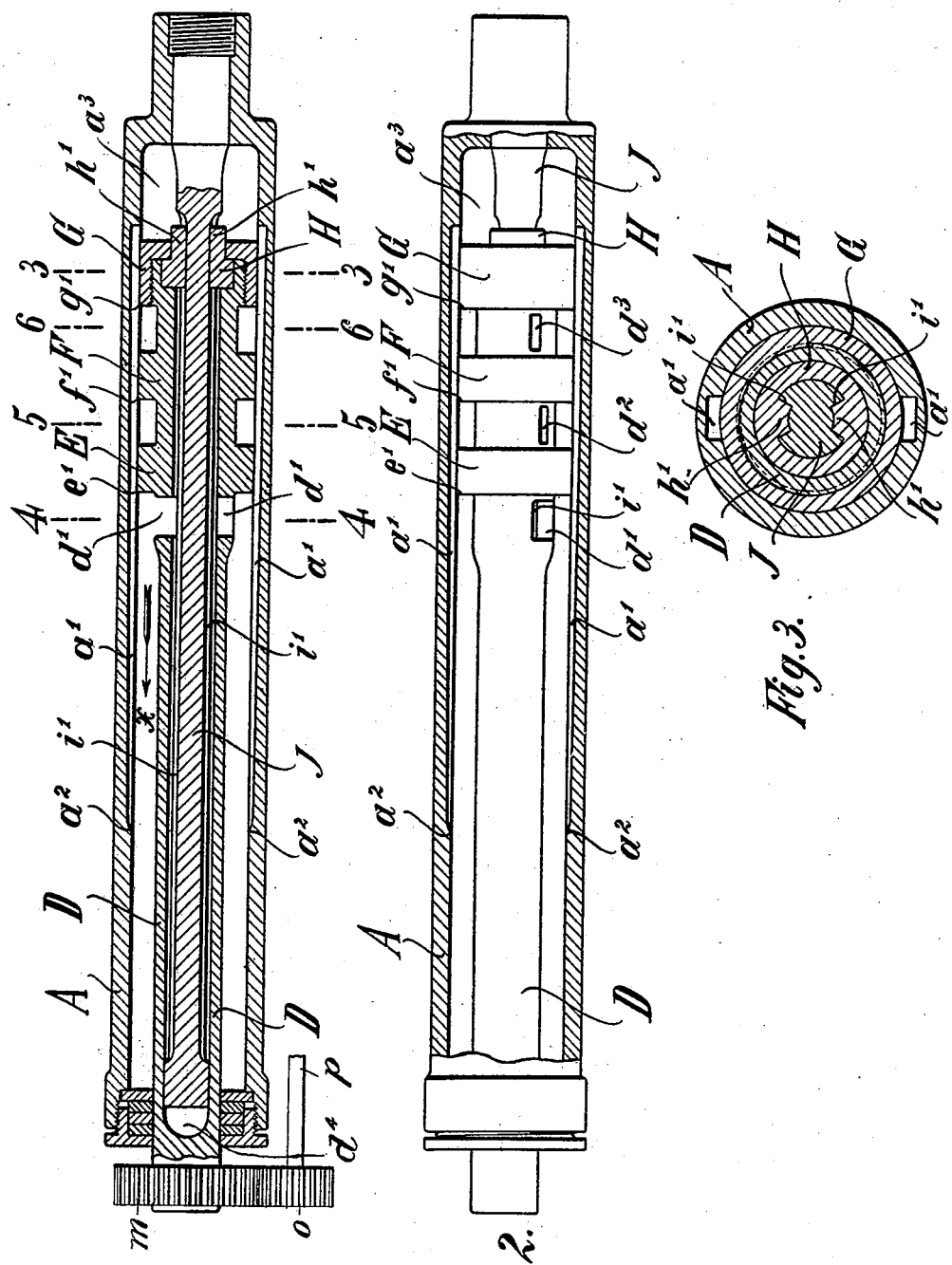

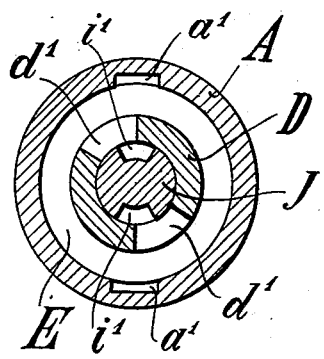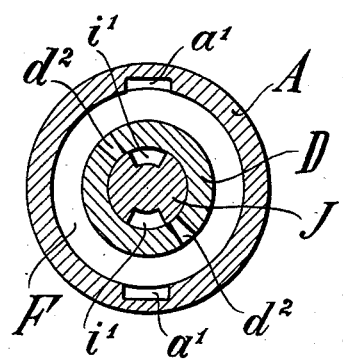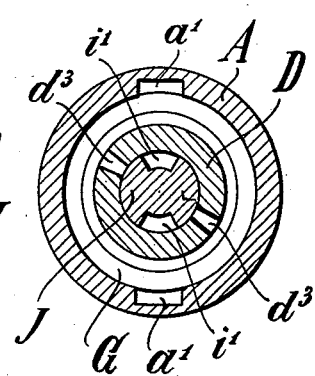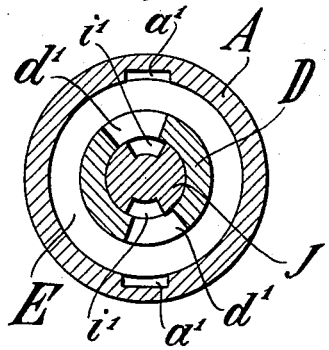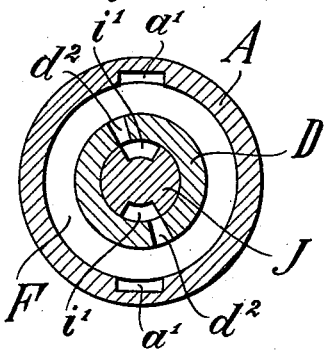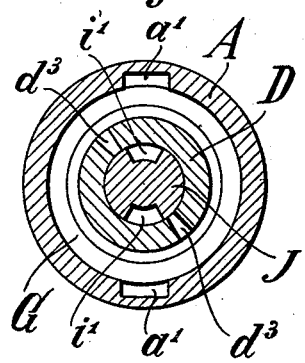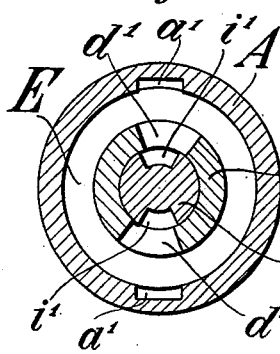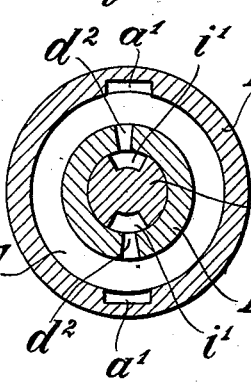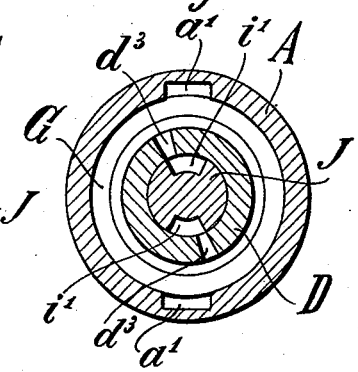

UNITED STATES PATENT OFFICE.

FRIEDRICH STOCK, OF ESSEN-ON-THE-RUHR, GERMANY, ASSIGNOR TO FRIED. KRUPP AKTIENGESELLSCHAFT, OF ESSEN-ON-THE-RUHR, GERMANY.

FLUID-BRAKE FOR RECOIL-GUNS.

No. 905,112.     Specification of Letters Patent.     Patented Nov. 24, 1908.

Application filed April 30, 1907. Serial No. 371,075.

*To all whom it may concern:*

Be it known that I, FRIEDRICH STOCK, a subject of the Emperor of Germany, and a resident of Essen-on-the-Ruhr, Germany, have invented certain new and useful Improvements in Fluid-Brakes for Recoil-Guns, of which the following is a specification.

The present invention relates to fluid brakes for recoil guns and the object of the invention is to provide a fluid brake which can be adjusted to different lengths of recoil and which is particularly distinguished by the absence of frail, movable structural parts.

In the accompanying drawing, Figure 1 shows one embodiment of the brake in longitudinal section; Fig. 2 is a view corresponding to that shown in Fig. 1 but partly in elevation; Figs. 3 to 6 are sections respectively on lines 3—3, 4—4, 5—5 and 6—6, Fig. 1, looking from the left; Figs. 7 to 9 are sections corresponding to those shown in Figs. 4 to 6 but with a different adjustment of the brake; Figs. 10 to 12 are sections corresponding to those shown in Figs. 4 to 6 but with a further adjustment of the brake; Figs. 3 to 12 are shown on an enlarged scale. Fig. 13 shows a longitudinal section, partly in elevation, of a portion of a second embodiment of the brake; Figs. 14 to 16 are sections respectively on lines 14—14, 15—15 and 16—16, Fig. 13, looking from the left; Fig. 17 shows a longitudinal section, partly in elevation of a third embodiment of the brake; Figs. 18 to 20 are sections respectively on lines 18—18, 19—19 and 20—20, Fig. 17, looking from the left.

Reference will first be had to the embodiment shown in Figs. 1 to 12. A is the brake cylinder. The piston rod D is provided with three pistons E, F and G spaced from one another. A counter-rod J, which is rigidly secured to the brake cylinder, projects into a longitudinal bore or hollow space $d^4$ in the piston and in the piston rod, the rod J being of the same diameter as the bore $d^4$. Two longitudinal grooves $a'$ cut in the wall of the brake cylinder provide communication between the fluid spaces of the cylinder to both sides of the pistons E, F, G. These grooves decrease in depth in the direction of the arrow X (Fig. 1) and are somewhat longer than the longest path of recoil for which the brake is adapted. For the passage of fluid there are further provided a pair of channels $i'$ in the wall of the counter-rod J and a pair of passageways $d'$, $d^2$ and $d^3$ in the piston rod and adjacent to the pistons E, F, G. The passageways $d'$, $d^2$ and $d^3$ are displaced relatively to each other, in the manner shown in Figs. 2 and 4 to 12. The channels $i'$ extend almost the entire length of the counter-rod J, (Fig. 1) and are of uniform cross-section throughout their length and are closed towards the piston side $a^3$ of the brake cylinder by means of projections $h'$ on a ring H which surrounds the counter-rod J and is rotatably but non-slidably mounted in the piston G.

When the piston rod D assumes the angular position (shown in Figs. 1 to 6) relatively to the rod J, only the passageways $d'$ communicate with the channels $i'$. If the recoil takes place while the brake is so adjusted the brake fluid can only pass through the grooves $a'$ from one side of the piston to the other and only until the ends $a^2$ of the grooves $a'$ reach the cut off edge $e'$ of the piston E bridging the grooves $a'$. The designation cut off edge for the edge $e'$ is selected because it limits the active cross-sectional circulation area, that is to say, the circulation area which by reason of the above described shape of the grooves $a'$ comes into consideration for the braking of the recoil. The above named adjustment of the brake gives the shortest recoil for which the brake is adapted.

If it is desired to obtain a longer recoil the piston rod D is turned by hand or automatically until besides the passageways $d'$, the passageways $d^2$ also communicate with the channels $i'$ (Figs. 7 to 9). The result of this is that, on recoil, after the ends $a^2$ of the grooves $a'$ have reached the cut off edge $e'$ of the piston E, the fluid can still pass through the passageways $d'$, the channels $i'$ and the passageways $d^2$ to the space between the pistons E and F and thence further through the grooves $a'$ to the piston-side $a^3$ of the brake cylinder. In this instance it is, therefore, the cut off edge $f'$ of the central piston F that is the active cut off edge, and the parts do not come to rest until the ends $a^2$ of the grooves $a'$ reach the cut off edge $f'$. When the brake is so adjusted the recoil is therefore longer than the above mentioned shortest recoil and the difference is equal to the distance between the cut off edge $e'$ and the cut off edge $f'$. Any suitable means may be used for turning the piston rod. In Fig. 1 the adjusting means is formed by a pinion $m$ on the piston rod D and an operating rod $p$ having a pinion $o$ meshing with the pinion $m$.

If the piston rod is turned until, besides the passageways $d'$ and $d^2$, also the passageways $d^3$ communicate with the channels $i'$ (Figs. 10 to 12) the fluid can pass from the channels $i'$ through the passageways $d^3$ into the space between the pistons F and G and thence through the grooves $a'$ to the piston side of the brake cylinder. In this instance the recoil does not end until the ends $a^2$ of the grooves $a'$ reach the now active cut off edge $g'$, of the piston G. The recoil is then as much longer than the shortest recoil as the distance between the cut off edges $e'$ and $g'$.

In the embodiment shown in Figs. 13 to 16 only one piston K is provided on the piston rod D. The piston is hollow and its hollow space $k^3$ opens into the piston rod side of the brake cylinder A. In the piston wall are provided two pairs of passageways $k'$ and $k^2$ which lead from the hollow space $k^3$ to the surface of the piston and which are displaced relatively to each other in the manner shown in Figs. 13, 15 and 16.

In that angular position of the piston relatively to the brake cylinder, which is shown in the drawing and which corresponds to the shortest recoil, the recoil is interrupted when the ends $a^2$ of the grooves $a'$ reach the cut off edge $k^4$ of the piston.

If the piston rod D is turned until the passageways $k'$ communicate with the grooves $a'$ it is still possible for the fluid to pass to the piston side of the brake cylinder after the ends $a^2$ of the grooves $a'$ have passed the cut off edge $k^4$, the passage of the fluid in that instance taking place through the hollow space $k^3$ and the passageways $k'$ to the grooves $a'$. The recoil, therefore, does not end until the ends $a^2$ of the grooves $a'$ have reached the edges $k^5$ of the passageways $k'$. If finally the piston rod is turned until the passageways $k^2$ communicate with the grooves $a'$ the recoil does not end until the ends $a^2$ of the grooves reach the edges $k^6$ of the passageways $k^2$.

In the embodiment shown in Figs. 17 to 20 the grooves $l'$, which permit the passage of the brake fluid, are arranged in the counter rod L which projects into the hollow piston rod. The wall of the piston rod N is provided with three pairs of passageways $n'$, $n^2$ and $n^3$ which are displaced relatively to each other as shown in the drawing.

The end of the recoil takes place when the groove ends $l^2$ register with the cut off edges $n^4$ or $n^5$ or $n^6$ according to whether the passageways $n'$ or $n^2$ or $n^3$ communicate with the grooves $l'$.

Having thus described the invention, what is claimed as new and desired to secure by Letters Patent, is:

1. In a fluid brake for recoil guns, a cylinder carrying a passageway, a piston member working in said cylinder and adapted to throttle the flow of fluid through said passageway; said piston having different portions respectively adapted to assume throttling relation to the passageway, spaced apart in the longitudinal direction of the piston, and means through which the different throttling portions are caused to become effective, whereby the cut off of the braking fluid takes place at different points in the length of the piston's movement.

2. In a fluid brake, the combination of a brake cylinder having a longitudinal groove, a piston within said cylinder having a plurality of longitudinally spaced cut off edges respectively adapted to coact with said groove to throttle the flow of fluid through the groove, and means establishing communication between the space in front of the piston and the respective spaces in front of the cut off edges.

3. In a fluid brake, the combination of a brake cylinder having a longitudinal groove, a piston member within said cylinder comprising a plurality of pistons providing a plurality of longitudinally spaced cut off edges respectively adapted to coact with said groove to throttle the flow of fluid through the groove, and means establishing communication between the space in front of the piston member and the respective spaces between the pistons.

4. In a fluid brake, the combination of a brake cylinder having a longitudinal groove, a piston within said cylinder having a plurality of longitudinally spaced cut off edges respectively adapted to coact with said groove to throttle the flow of fluid through the groove, and means establishing communication between the space in front of the piston and the respective spaces in front of the cut off edges, comprising the hollow piston rod, radial passageways from the hollow of the piston rod to the spaces in front of the braking edges, and a longitudinally grooved counter rod; means being provided to cause registry between the groove of the counter rod and either of the radial passageways.

5. In a fluid brake, the combination of a brake cylinder having a longitudinal groove, a piston within said cylinder having a plurality of longitudinally spaced cut off edges respectively adapted to coact with said groove to throttle the flow of fluid through the groove, and means establishing communication between the space in front of the piston and the respective spaces in front of the cut off edges, comprising a hollow piston rod having a radial passageway for each cut off edge, a counter rod having a longitudinal groove, and means for causing relative rotation between the piston rod and counter rod to determine which of the radial passageways shall be in registry with the longitudinal groove in the counter rod.

6. In a fluid brake, the combination of a brake cylinder having a longitudinal groove, a piston within said cylinder having a plurality of longitudinally spaced cut off edges respectively adapted to coact with said groove to throttle the flow of fluid through the groove, and means establishing communication between the space in front of the piston and the respective spaces in front of the cut off edges, comprising a hollow piston rod having a radial passageway for each cut off edge, a counter rod having a longitudinal groove, and means for causing relative rotation between the piston rod and counter rod to determine which of the radial passageways shall be in registry with the longitudinal groove in the counter rod, the groove and the radial passageways being proportioned and disposed so that by the rotary adjustment they are caused to register and open communication through the radial passageways successively, comemncing with that radial passageway communicating with the cut off edge first becoming effective on recoil.

7. In a fluid brake, the combination of a brake cylinder having a longitudinal groove, a piston within said cylinder having a plurality of longitudinally spaced cut off edges respectively adapted to coact with said groove to throttle the flow of fluid through the groove, and means establishing communication between the space in front of the piston and the respective spaces in front of the cut off edges, comprising a hollow piston rod having a radial passageway for each cut off edge, a counter rod having a longitudinal groove, and means for causing relative rotation between the piston rod and counter rod to determine which of the radial passageways shall be in registry with the longitudinal groove in the counter rod, the groove and the radial passageways being proportioned and disposed so that by the rotary adjustment they are caused to register and open communication through the radial passageways successively, commencing with that radial passageway communicating with the cut off edge first becoming effective on recoil, and maintaining each communication made, as those subsequent thereto are established.

The foregoing specification signed at Dusseldorf, Germany, this seventeenth day of April, 1907.

FRIEDRICH STOCK.

In presence of—
ALFRED POHLMEYER,
M. ENGELS.